UNITED STATES PATENT OFFICE.

C. IRVINE WALKER, OF CHARLESTON, SOUTH CAROLINA, ASSIGNOR TO THE STONEY LANDING COMPANY, OF SAME PLACE.

MANUFACTURE OF ARTIFICIAL-STONE COMPOSITIONS.

SPECIFICATION forming part of Letters Patent No. 311,156, dated January 20, 1885.

Application filed October 27, 1884. (No specimens.)

*To all whom it may concern:*

Be it known that I, C. IRVINE WALKER, a citizen of the United States, and a resident of Charleston, South Carolina, have invented certain Improvements in the Manufacture of Artificial-Stone Compositions, of which the following is a specification.

My present invention, which is fully described and claimed hereinafter, consists of an improvement upon, or, rather, it is based upon, the Letters Patent No. 283,358, granted August 14, 1883.

It has been found that limes naturally containing silica in finely-divided condition make better artificial stone than pure lime, because in slaking such silicious limes the silica is readily acted upon by the lime, and a speedy formation of silicate of lime—the cementing bond—is induced.

The above-mentioned patent was based upon the use of the silicious lime in the manufacture of artificial stone; but as said silicious limes are not found in all localities where needed, I use, in carrying out my present invention, lime free from or deficient in silica, and add the necessary amount of silica thereto in such a manner that in making artificial stone the best results may be attained. For this purpose I first grind the lime and silica to a fine powder (the two being preferably ground together) and thoroughly mix them before slaking the lime, so that, as the finely-divided particles of silica are thoroughly and uniformly distributed throughout the mass, the proper action of the lime thereupon in slaking is insured. The composition is completed by the addition of ordinary sand or fine gravel, and is mixed under moist heat, and molded under pressure into blocks of the proper size.

In carrying out my invention I have ordinarily used the following proportions, as giving the best general results, but do not confine myself strictly thereto, as the proportions may be varied to meet special requirements: unslaked ground lime, seventy-five to eighty parts; finely-powdered silica, twenty to twenty-five parts; ordinary sand or gravel, four hundred parts. Coloring materials may also be added to the composition when a colored stone is desired.

I claim as my invention—

The mode herein described of making an artificial-stone composition, said mode consisting in grinding lime and silica to powder, intimately mixing the two, slaking the lime, and adding sand or gravel, as set forth.

In testimony whereof I have signed my name to this specification in the presence of two subscribing witnesses.

C. IRVINE WALKER.

Witnesses:
 JOHN M. CLAYTON,
 HARRY SMITH.